(12) United States Patent
Arthur et al.

(10) Patent No.: US 7,737,867 B2
(45) Date of Patent: Jun. 15, 2010

(54) MULTI-MODAL COCKPIT INTERFACE FOR IMPROVED AIRPORT SURFACE OPERATIONS

(75) Inventors: Jarvis J. Arthur, Williamsburg, VA (US); Randall E. Bailey, Williamsburg, VA (US); Lawrence J. Prinzel, III, Newport News, VA (US); Lynda J. Kramer, Yorktown, VA (US); Steven P. Williams, Yorktown, VA (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 434 days.

(21) Appl. No.: 11/696,333

(22) Filed: Apr. 4, 2007

(65) Prior Publication Data

US 2007/0241936 A1 Oct. 18, 2007

Related U.S. Application Data

(60) Provisional application No. 60/797,080, filed on Apr. 13, 2006.

(51) Int. Cl.
*G01C 21/00* (2006.01)
(52) U.S. Cl. ............... 340/980; 340/909; 340/951; 701/120; 701/301
(58) Field of Classification Search .......... 340/980, 340/945, 947, 971, 904–905, 909–910, 915, 340/946, 948, 951, 959, 963, 972–973, 982; 701/120, 3, 16, 301, 4, 10
See application file for complete search history.

(56) References Cited

U.S. PATENT DOCUMENTS

| | | | | |
|---|---|---|---|---|
| 5,281,957 A * | 1/1994 | Schoolman | ............ | 345/8 |
| 5,566,073 A * | 10/1996 | Margolin | ............ | 701/213 |
| 5,593,114 A * | 1/1997 | Ruhl | ............ | 244/183 |
| 6,061,068 A * | 5/2000 | Hoffman et al. | ............ | 345/619 |
| 6,496,189 B1 | 12/2002 | Yaron et al. | | |
| 6,747,649 B1 | 6/2004 | Sanz-Pastor et al. | | |
| 6,879,896 B2 | 4/2005 | Martens | | |
| 6,903,752 B2 * | 6/2005 | Ebersole et al. | ............ | 345/632 |
| 6,931,368 B1 | 8/2005 | Seifert | | |
| 7,010,398 B2 | 3/2006 | Wilkins, Jr. et al. | | |
| 7,123,260 B2 | 10/2006 | Brust | | |
| 7,212,216 B2 | 5/2007 | He et al. | | |
| 2002/0087296 A1* | 7/2002 | Wynn | ............ | 703/8 |
| 2004/0006412 A1* | 1/2004 | Doose et al. | ............ | 701/10 |
| 2005/0232512 A1 | 10/2005 | Luk et al. | | |
| 2006/0066459 A1* | 3/2006 | Burch et al. | ............ | 340/980 |
| 2007/0020588 A1 | 1/2007 | Batcheller et al. | | |

* cited by examiner

*Primary Examiner*—Daniel Previl
(74) *Attorney, Agent, or Firm*—Helen M. Galus

(57) ABSTRACT

A system for multi-modal cockpit interface during surface operation of an aircraft comprises a head tracking device, a processing element, and a full-color head worn display. The processing element is configured to receive head position information from the head tracking device, to receive current location information of the aircraft, and to render a virtual airport scene corresponding to the head position information and the current aircraft location. The full-color head worn display is configured to receive the virtual airport scene from the processing element and to display the virtual airport scene. The current location information may be received from one of a global positioning system or an inertial navigation system.

36 Claims, 6 Drawing Sheets

MULTI-MODAL COCKPIT INTERFACE FOR IMPROVED AIRPORT SURFACE OPERATIONS

CROSS-REFERENCE TO RELATED APPLICATIONS

This application claims priority to U.S. Provisional Application No. 60/797,080, filed Apr. 13, 2006, the contents of which are incorporated herein in their entirety.

FIELD OF THE INVENTION

The present invention generally relates to aircraft navigation and safety systems and, more particularly, relates to systems, devices and methods for displaying navigational information to assist in aircraft surface operations.

BACKGROUND OF THE INVENTION

Aircraft surface operations involve taxiing of an aircraft from a terminal gate (or generally from the ramp or apron area) to an assigned runway in preparation for takeoff, or movement of an aircraft from a runway to a terminal gate after landing. Taxi instructions, at towered, control airports, are verbally issued by ground control using radio-telephony to the aircraft. When an aircraft taxies across the airport, it travels on a series of assigned taxiways based on directions received from a ground controller. Ground controllers at busy airports may be directing the movement of several dozen aircraft at any particular time. A taxiing aircraft will often have to travel across active runways to reach its destination; therefore, it is critical to coordinate surface operations with takeoff/landing instructions to prevent runway incursions. A runway incursion is "any occurrence in the airport runway environment involving an aircraft, vehicle, person, or object on the ground that creates a collision hazard or results in a loss of required separation with an aircraft taking off, intending to take off, landing, or intending to land" (Runway Safety, Federal Aviation Administration, available at http://www-.faa.gov/runwaysafety/). Even when there is no risk of collision, an aircraft taking off or landing on the wrong runway can result in a crash if the actual runway used is too short to accommodate the aircraft.

Ensuring that an aircraft uses the correct, safe route from the gate to the runway (and vice versa) requires both that the ground controller provide correct instructions to the aircraft and that the aircraft precisely follow those instructions. Signs and other markings help a pilot identify the taxiways and runways. These signs and markings may be confusing, especially to a relatively inexperienced pilot or to a pilot at an unfamiliar or confusing airport. Further, reduced visibility at night or during inclement weather can cause a pilot to misread or fail to see these signs and markings.

To assist in surface operations, pilots utilize airport maps. These maps were traditionally paper charts. However, pilots can now utilize an electronic moving map or "electronic flight bag" (EFB), which displays a digitized map of the airport. The EFB may be coupled with the aircraft's navigation system such that the aircraft's current position is displayed on the map, thereby enabling the pilot to readily see if the aircraft is on the assigned taxiway/runway, and to anticipate turns.

During surface operations, it is also critical that the pilot watch for other aircraft and service vehicles (such as catering trucks) which are nearby and may constitute a collision hazard. This is particularly important when visibility is reduced. As such, it is desirable that a pilot minimize the percentage of taxiing time spent looking down at charts, instruments, or the like, and maximize the percentage of time spent looking out the windshield (also termed windscreen). While a pilot is looking down at charts, etc., the pilot is said to be "heads-down." While a pilot is looking out the windshield, the pilot is said to be "heads-up."

During surface operations, it is also critical that the pilot(s) listen for their aircraft call sign for updates, modifications, revisions, or other changes to taxi clearance. The potential for a collision hazard exists if the pilot(s) do not receive the new clearance instructions or misunderstand the taxi clearance due to errors of omission or commission. Due to the quality of Very High Frequency (VHF) radio telephony currently used for airport surface operations, a significant hazard exists for mistakes made during read-back, callback, and hear-back of taxi instructions. During restricted visibility or other conditions that significantly increase workload for the pilot(s), the incidence of these types of occurrences and potential consequences increase, particularly for long or complex taxi clearance. Pilots may be "heads-down" during receiving and copying of taxi clearances.

One known technology for displaying navigational and safety information within an aircraft is a heads-up display (HUD). The HUD projects information onto a transparent display screen, such that the pilot can see the projected information while also having an unobstructed view outside the aircraft. This information can be of great value to a pilot, particularly in low visibility situations. However, there are several drawbacks of the HUD. The HUD has a limited field of view (typically 30 degrees horizontal by 24 degrees vertical), so that objects outside of this field of view cannot be represented. Additionally, HUDs only project a monochromatic (typically green) display, thereby preventing the use of multiple colors to help make a crowded display more readable. HUDs are also typically quite expensive, and must be integrated into the airframe of an aircraft.

BRIEF SUMMARY OF THE INVENTION

An object of the present invention is to overcome the aforementioned drawbacks of current aircraft navigational and safety systems and to provide improved safety while taxiing. In one embodiment of the invention, a system for multi-modal cockpit interface during surface operation of an aircraft comprises a head tracking device, a processing element, and a full-color head worn display. The processing element is configured to receive head position information from the head tracking device, to receive current location information of the aircraft, and to render a virtual airport scene corresponding to the head position information and the current aircraft location. The full-color head worn display is configured to receive the virtual airport scene from the processing element and to display the virtual airport scene. The current aircraft location information may, for example, be received from a global positioning system, an inertial navigation system, or a multi-lateration system.

The processing element may be further configured to receive current location information of other vehicles near the aircraft and to render the other vehicles within the virtual airport scene. The processing element may be further configured to receive taxi clearance information and the head worn display may be further configured to receive the taxi clearance information from the processing element and to display the taxi clearance information. The taxi information may be received via one of a voice link or a digital data link. If the taxi information is received via a voice link, the processing element can be further configured to convert the taxi information into text. The taxi clearance information may comprise a plurality of sequential instructions, and the processing element may be configured to determine, based on the current aircraft location, which of the sequential instructions has been performed and which is next to be performed. The next sequential instruction to be performed may be indicated on the display of the taxi clearance information.

The processing element may be further configured to render a top-down airport map illustrating a taxi route based on the taxi clearance information. The head worn display may be further configured to receive the top-down airport map from the processing element and to display the top-down airport map. The processing element may be further configured to render an indicator of the current aircraft location on the top-down airport map.

The processing element may be further configured to render a top-down representation of a portion of a taxiway/runway upon which the aircraft is currently located. The portion of the taxiway/runway may comprise a predetermined length of taxiway/runway forward of the aircraft and, optionally, a predetermined length of taxiway/runway aft of the aircraft. The representation may comprise edges of the rendered portion of the taxiway/runway. The representation may further comprise an aircraft indicator showing a position of the aircraft relative to the taxiway/runway edges, the aircraft indicator can include wheel assembly indicators showing positions of the wheel assemblies relative to the edges. The head worn display may be further configured to receive the representation from the processing element and to display the representation. The representation may further comprise an identifier of the taxiway/runway upon which the aircraft is currently located. The representation may yet further comprise forward markings showing a planned route of the aircraft on the rendered portion of the taxiway/runway, and, optionally, aft markings showing a past route of the aircraft on the rendered portion of the taxiway/runway.

In at least one embodiment, the processing element may be further configured to receive a pilot display preference. Based on the received pilot display preference, the head worn display may be further configured to receive and display, for example, one or more of: the virtual airport scene, the taxi clearance information, the top-down airport map, and the representation of the taxiway/runway upon which the aircraft is currently located.

In addition to the system for multi-modal cockpit interface during surface operation of an aircraft as described above, other aspects of the present invention are directed to corresponding devices and methods for multi-modal cockpit interface during surface operation of an aircraft.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which advantageous embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, additional display modes of the system of the present invention are possible, and would fall within the scope of the present invention. Like numbers refer to like elements throughout.

Figure 1:
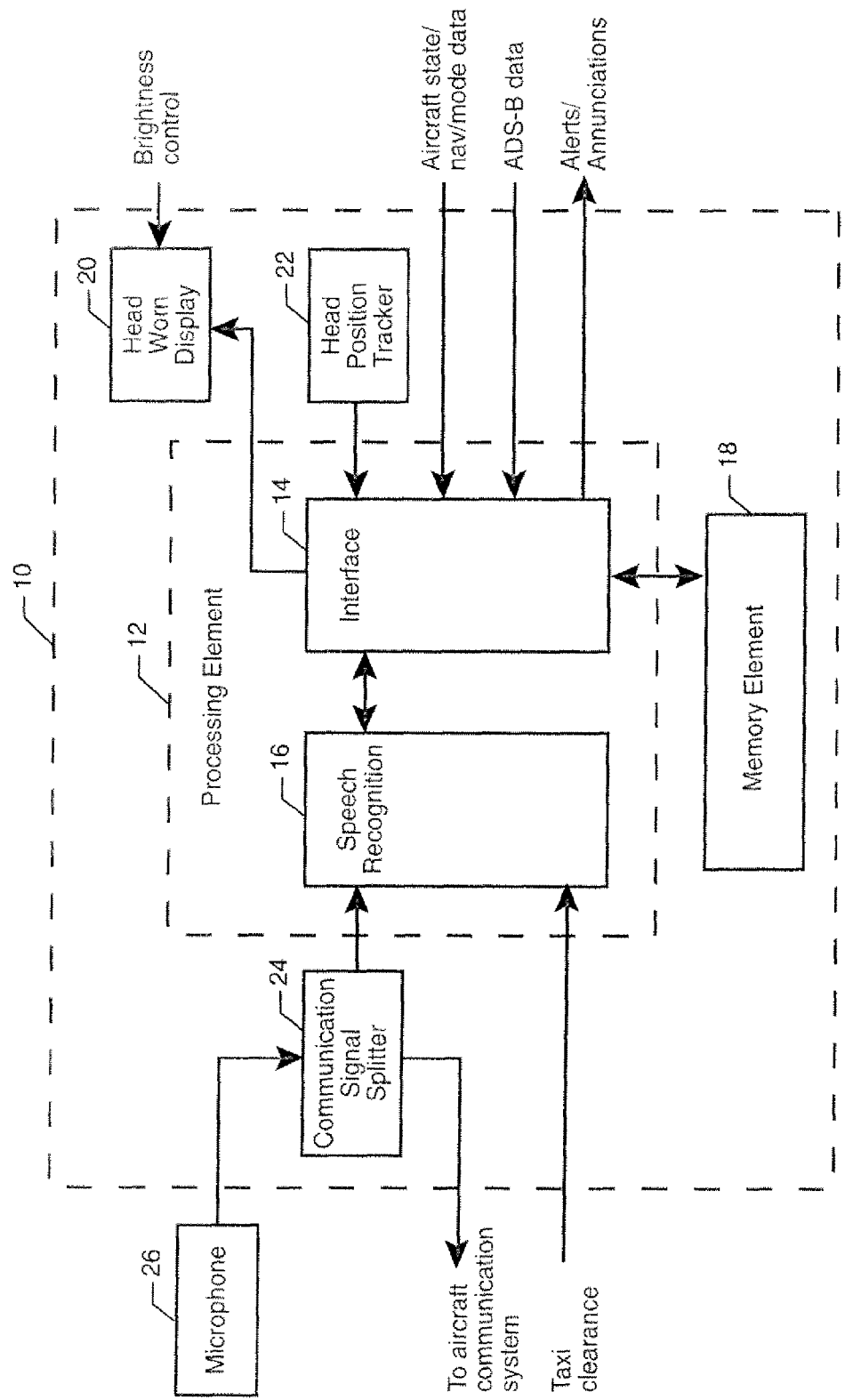
FIG. 1 is a schematic block diagram of a system for multi-modal cockpit interface during surface operation of an aircraft, in accordance with at least one embodiment of the invention.

Referring now to FIG. 1, a schematic block diagram of a system 10 for multi-modal cockpit interface during surface operation of an aircraft, in accordance with one embodiment of the invention. Surface operation refers to operation of the aircraft on the ground under the aircraft's own power, such as taxiing from a gate to a runway or from a runway to a gate. The system 10 comprises a processing element 12, a memory element 18, a head worn display 20, a head position tracker 22, and a communication signal splitter 24. The processing element 12 is further comprised of an interface element 14 and a speech recognition element 16. The processing element 12 receives head position information from the head tracking device 22, via the interface 14, to enable the processing element to determine in which direction the pilot is looking. Any suitable head tracking device may be used. In one embodiment, an optical head tracking device is used in which the pilot wears an optical sensor and an optical laser scanner is mounted inside the airplane cockpit to transmit signals enabling determination of pilot head position, such as the laserBIRD™ tracker from Ascension Technology Corporation. In another embodiment, a computer-vision-based head tracking device is used in which two cameras are aimed toward the pilot's face to enable determination of pilot head position. The processing element 12 receives current location information of the aircraft. The location information may be received via the interface element 14 from an aircraft navigation system, such as from a global positioning system (GPS) or an inertial navigation system (INS).

Based on the pilot's head position and the current aircraft location, the processing element 12 renders a real-time virtual airport scene to be displayed on the head worn display (HWD) 20. In at least one embodiment, the full-color head worn display receives the virtual airport scene from the processing element and displays the virtual airport scene. Any suitable full-color head worn display device may be used, such as the LE-500 from Liteye Systems, Inc. The use of a HWD, coupled with a head tracking device, enable an unlimited field of regard, as compared to the use of a HUD which provides a very limited field of regard. The term "full-color" is used herein to distinguish the HWD of the present system from the monochromatic display of known heads-up displays, and may encompass any display capable of displaying multiple shades of red, green, and blue colors, over at least a portion of the display. For example, the HWD may be capable of displaying at least 256 levels of red, green and blue colors which corresponds to 16.8 million different possible colors.

Figure 2:
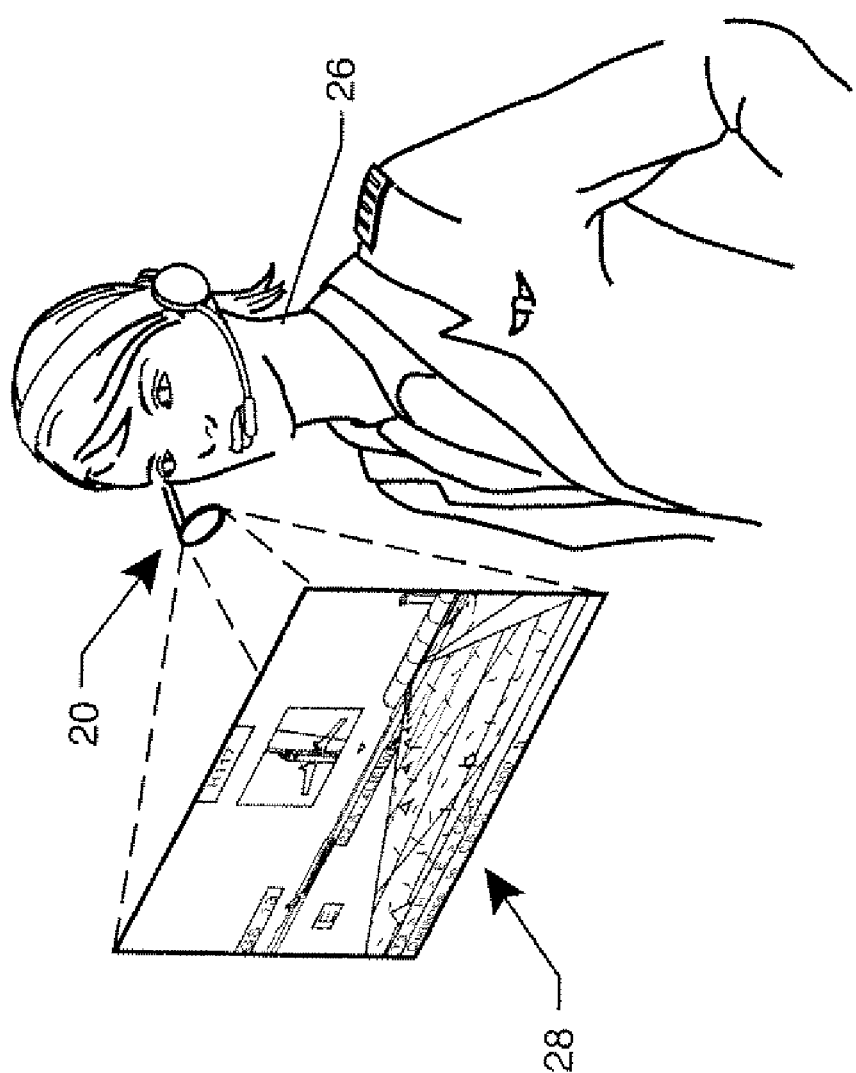
FIG. 2 illustrates the use by a pilot of a system for multi-modal cockpit interface during surface operation of an aircraft, in accordance with at least one embodiment of the invention.

Referring now to FIG. 2, a pilot is illustrated wearing a head worn display 20, in accordance with one embodiment of the invention. As can be seen in FIG. 2, the head worn display 20 may be a lightweight monocular display, capable of mounting on a pilot's headset or glasses, or on a dedicated headband. In one embodiment, the display element of the HWD may have a resolution of 800×600 pixels and a field of view (FOV) of 23 degrees horizontal by 16.5 degrees vertical. In another embodiment, the display element may have a resolution of 640×480 pixels and a field of view (FOV) of 14 degrees horizontal by 10.4 degrees vertical. In one embodiment, the HWD may have an opaque sliding door, such that the display element is selectably see-through or opaque. In another embodiment, the display element is only opaque. The monocular HWD enables the pilot to view the virtual airport scene 28 while also still being able to view the aircraft instruments and controls and the "real world" airport. The pilot's headset and microphone 26 are part of the standard aircraft communication system, allowing a pilot to speak with controllers, the co-pilot, and other aircraft. In at least one embodiment, the headset and microphone may be integrated with the system of the present invention. For example, the signal from the microphone may be input to a splitter 24 to enable the signal to be received both by the aircraft communication system and by the processing element. By using a speech recognition element 16, the processing element is able to convert voice commands from the pilot into system operations. Thus, in at least one embodiment, the pilot is able to control operation of the system using voice commands. For example, the pilot is able to select among different modes of information to display on the HWD (as discussed further below) using voice commands. The ability to receive and process voice commands provides an intuitive means for the pilot to interact with the system, and leads to reduced costs of installation and training as the cockpit need not be modified to incorporate another interface device (e.g., button or knob) that the pilot would be required to locate and learn to operate. In addition, the pilot's ability to control the brightness level of the HWD is important. Frequently, the outside lighting conditions can greatly affect the readability of the HWD, thus, typically, the pilot should have control of the display brightness. The pilot's control of brightness can be achieved via a rotary knob or speech recognition. Another desirable pilot function is the ability to remove items from the image in the HWD which are not of particular importance at the current time. This feature, termed "decluttering," may, for example, include: (1) the ability to remove the overhead insert scene (element 70 in FIG. 3) from the display; (2) the ability to remove all of the virtual scene (element 28 of FIG. 2) from the display; and (3) the ability to restore the display HWD to its default state as shown in element 28 of FIG. 3. Further, the processing element may provide warnings and announcements to the pilot through the headset. If the taxi information is received via a voice link, the speech recognition system can be configured to convert the taxi information into text or graphical information for display to the crew. If the taxi instructions are transmitted back to ground control for confirmation, the speech recognition system may also interpret the crew's read-back of the taxi instructions. The read-back may then be compared to the ground control transmission for correctness such that an alert may be provided to the flight crew in the event that the read-back is incorrect or improper.

The virtual airport scene provides a full-color, real-time, three-dimensional view of the portion of the airport in which the aircraft is currently located and which is in the pilot's direction of view (the pilot's direction of view may be considered a virtual camera angle through which the virtual airport scene is viewed). The virtual airport scene can include a virtual rendering of substantially all surfaces, structures, vehicles, and potential obstructions that would be within the pilot's current field of view assuming unimpaired visibility. Thus, the current surface (ramp area, taxiway, or runway) upon which the aircraft is operating, surfaces adjacent the current surface (including, but not limited to, other taxiways/ runways and unpaved and unmarked airport surfaces between the taxiways/runways), airport buildings, other aircraft, service vehicles, ground vehicles, personal use vehicles, navigation aids, and all other significant airport elements can be included in the scene. Further, the virtual airport scene may include a virtual rendering of navigational or other operational information, such as ground speed indication, compass heading, symbology to graphically denote the aircraft heading, an indicator of error from the taxiway centerline, taxiway/runway identifiers, taxiway/runway edge markers, taxiway/runway centerline indicators, virtual aircraft, current cleared taxi route, virtual cones to identify the taxi edges, virtual turn signs to aid in turn awareness, virtual stop signs to denote hold short instructions, taxi clearance instructions and "distance to go" on the current taxiway. Such a virtual airport scene enables a pilot to readily see, anticipate, and avoid obstacles (especially other aircraft) and to know precisely the aircraft's current location, even in a low visibility situation. This ability to see obstacles and the current position regardless of any impairment to visibility, such as snow, fog, or darkness, significantly improves safety of surface operations. This extra margin of safety in turn allows a pilot to taxi at a higher speed than might otherwise be possible because of low visibility, thereby reducing or eliminating one factor that contributes to flight delays during inclement weather.

In at least one embodiment, the processing element renders the virtual airport scene using highly detailed airport mans stored in memory element 18. These detailed mans include location information for taxiways, runways, ramps, gates, buildings, and all other significant permanents structures and surfaces. Typically, maps would be airport specific, and thus would be organized and stored by airport. Upon flight approach to a destination airport (as determined based on aircraft location information and flight plan information), the processing element may begin accessing the appropriate maps to avoid any delay in rendering the necessary virtual airport scene once the aircraft has landed.

The location of other aircraft may be determined using an Automatic Dependent Surveillance-Broadcast (ADS-B) system. ADS-B is an air traffic surveillance technology in which all aircraft automatically and repeatedly broadcast digital data packets containing the aircraft's unique airframe identification, flight identification (call sign), current latitude and longitude, current altitude, and current three-dimensional velocity (i.e., rate of climb/descent, direction, and speed). The ADS-B information may be received from all nearby aircraft by the interface 14. The processing element 12 is able to determine the location of each aircraft, thereby enabling the processing element to render any aircraft that would be within the pilot's field of view. The unique airframe identification enables the processing element to determine the type of aircraft (e.g., Boeing 777) in order to render the nearby aircraft on the display and to annunciate to the flight crew the aircraft type to aid visual identification and to enable the flight crew to take, as appropriate, action specific to the aircraft type (e.g., providing extra spacing near A-380 aircraft operations). Virtual models of a large number of different aircraft types may be stored in memory element 18 to enable the processing element to accurately render each different aircraft type. The ADS-B system may also be implemented for service vehicles, such as fuel trucks and catering trucks, to enable the system to determine the position of these vehicles and render the vehicles appropriately in the virtual airport scene.

Figure 3:
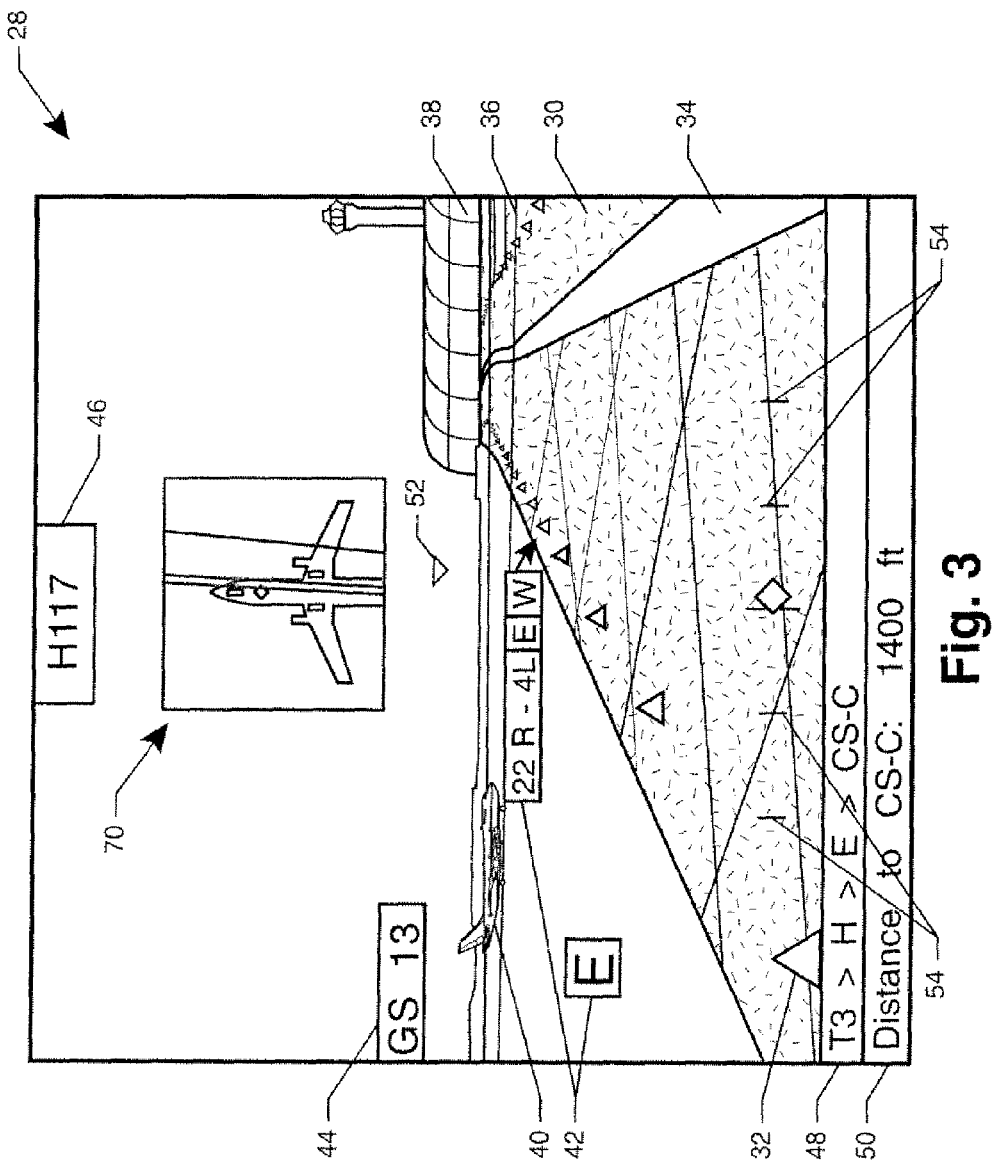
FIGS. 3-6 illustrate display modes of a system for multi-modal cockpit interface during surface operation of an aircraft, in accordance with embodiments of the invention.

Referring now to FIG. 3, a display of a virtual airport scene is illustrated, in accordance with an embodiment of the invention. As discussed above, the virtual airport scene 28 is a full-color, real-time, three-dimensional view of the portion of the airport in which the aircraft is currently located and which is in the pilot's direction of view. The virtual airport scene of FIG. 3 includes a virtual rendering of the taxiway 30, edge markers 32 of the taxiway, a runway 36 that the aircraft is about to taxi across, the airport terminal building 38, and another aircraft 40 that appears to be on an intersecting route. The virtual airport scene may include a route indicator 34 superimposed on the taxiways/runways, showing the route that the aircraft has been instructed to follow. The route indicator may be a continuous line, as shown in FIG. 3, or may be a series of spaced apart markers. The virtual airport scene 28 also includes a virtual rendering of navigational and other operational information, such as ground speed indication 44, compass heading 46, taxiway/runway signs 42, clearance text 48, and a distance to the next point on the route 50. As will be discussed in more detail below, the clearance text 48 describes the route that the aircraft has been directed to take by the ground controller. In FIG. 3, the route is indicated as "T3>H>E>CS-C," which indicates that the pilot should taxi from Taxiway Tango 3, to Taxiway Hotel, to Taxiway Echo, and finally to Concourse C. Different colors or other methods may be used to indicate which segment(s) of the route has already been traveled, which is currently being traveled, and which is yet to be traveled. The next segment of the route to be traveled may be separately illustrated along with an indication of the distance to that next segment. A centerline "taxi-to" error indicator 54 provides precision guidance in a format that the pilot is familiar. An indication of the airplane heading symbology 52 provides orientation of the aircraft as the scene is rendered as a result of head movement. Although not illustrated on FIG. 3, the processing element may also determine at which points along the route the pilot should stop the aircraft, e.g., prior to crossing an active runway, and may display a "stop sign" or some other visual indicator of the need to stop at such points.

Figure 6:
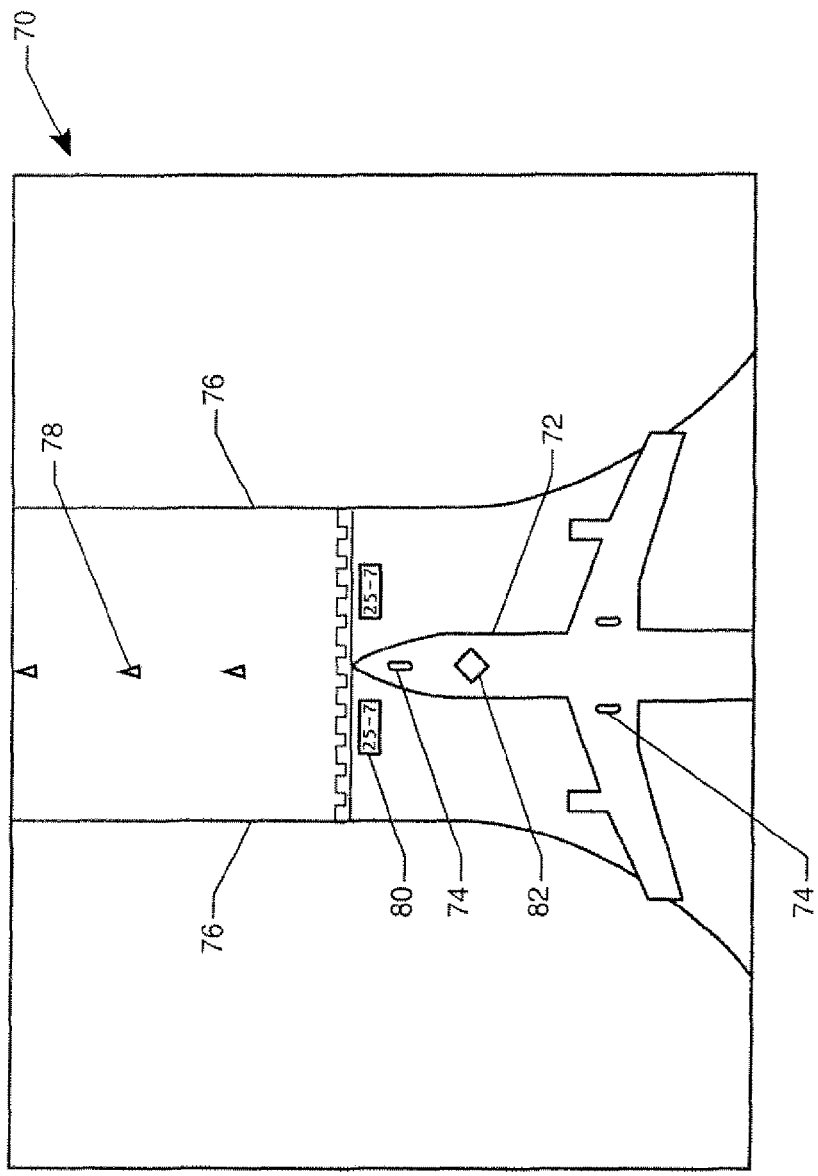

As further discussed below in conjunction with FIG. 6, the processing element may superimpose on the virtual airport scene a top-down representation 70 of a portion of a taxiway/runway upon which the aircraft is currently located. Optionally, this top-down representation may be displayed separately as illustrated in FIG. 6.

Figure 4:
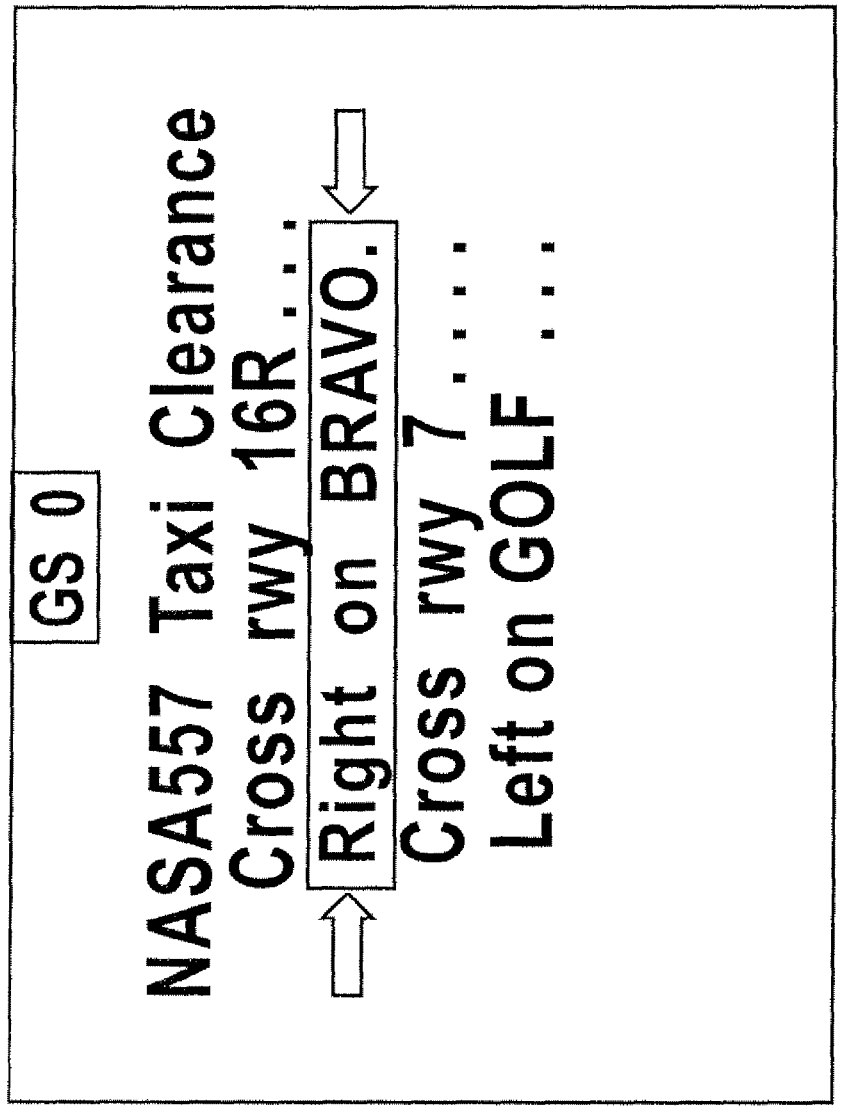

Although FIG. 3 illustrates that the virtual airport scene may include a display of clearance directions, in an alternative display mode the clearance directions may be displayed separately. Displaying the clearance directions separately allows a greater amount of information to be included in the display, such as landmarks (e.g., runways that the aircraft needs to cross along its directed route, termed "crossing runways") preceding an upcoming turn to assist the pilot in following the correct path. The processing element 12 may be configured to receive taxi clearance information, such as via a voice link or a digital data link (such as the controller-pilot data link (CPDL)). If the taxi information is received via a voice link, the processing element is configured to convert the taxi information into text. The taxi clearance information typically comprises a plurality of sequential instructions. The received taxi clearance information may be simply displayed on the HWD. Optionally, the processing element may be configured to determine, based on the current aircraft location, which of the sequential instructions has been performed and which is next to be performed. As discussed above, different colors or other methods may be used to indicate which segment(s) of the route has already been traveled, which is currently being traveled, and which is yet to be traveled. The processing element may be configured to identify landmarks and crossing runways that the pilot will encounter along the taxi route, and to insert those landmarks and symbolic cues into the virtual scene. If a cleared route crosses a runway, pilots are typically required to contact the ground controller before proceeding across a runway, unless otherwise specifically cleared to cross. Referring now to FIG. 4, a display of a portion of taxi clearance directions is illustrated, in accordance with an embodiment of the invention. In FIG. 4, the received taxi clearance information (of the portion displayed) included two instructions: (1) turn right on Taxiway Bravo; and (2) turn left on Taxiway Golf. The processing element identified that, while traveling on the directed route, the aircraft will cross Runway 16R prior to turning on Taxiway Bravo and will cross Runway 7 prior to turning on Taxiway Golf. To assist the pilot, the processing element added those crossovers to the displayed taxi clearance information. In FIG. 4, the processing element has determined, based on the aircraft's current location, that the next action to take is to turn right on Taxiway Bravo. Therefore, the processing element has highlighted that segment of the route with a box and arrows, although any suitable highlighting technique may be used.

The processing element may also have error-checking capability. For example, the processing element may also be configured to error-check the received taxi clearance information by determining if each segment of the received taxi instructions is contiguous with each preceding segment. A lack of contiguity between each segment may indicate an error in the received taxi instructions. The system may create a visual and/or audible alarm to alert the pilot of a potential error in the taxi instructions, and may transmit a notice to the ground controller of the potential error and automatically request confirmation/correction. By knowing the current aircraft location and which of the sequential instructions is next to be performed, the processing element may be further configured to detect that the aircraft has failed to follow the received taxi instructions (e.g., has made a wrong turn or failed to make a turn as instructed). The system may create a visual and/or audible alarm to alert the pilot of the error, and may transmit a notice to the ground controller of the error. Also, potential conflicts with other traffic could be detected and alerted to the pilot. The system may also create a visual and/or audible alarm to alert the pilot of a closed runway/taxiway, or if the system detects that the aircraft is off-route or on the wrong runway. If specific weight-bearing or wing-span limitations are imposed on taxiways and ramp areas, these limitations may be identified in the display and alerted to the flight crew aurally if the aircraft currently exceeds these limits. Runway incursion prevention system alerts may also be provided.

Figure 5:
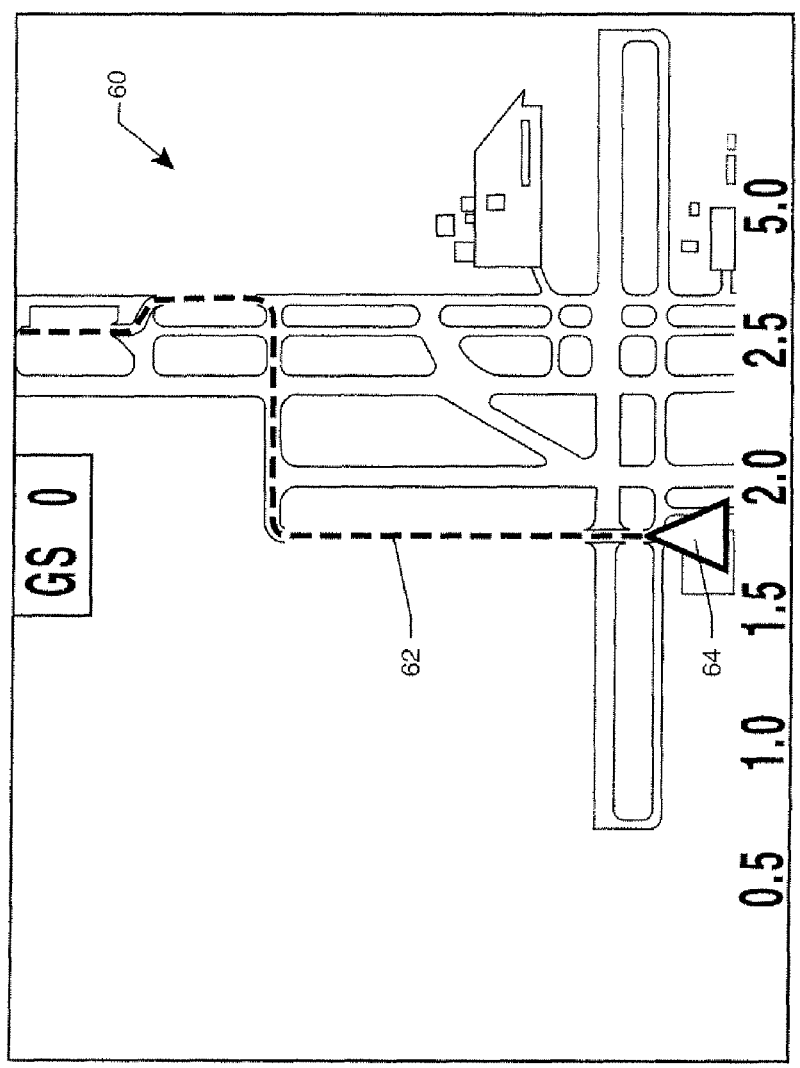

The processing element 12 may be further configured to render a top-down airport map illustrating the taxi route based on the received taxi clearance information. This top-down map may then be displayed on the HWD. Referring now to FIG. 5, a display of such a top-down airport map 60 is illustrated, in accordance with an embodiment of the invention. Superimposed on the map 60 is the taxi route 62 (illustrated in FIG. 5 as a dashed white line) that the pilot has been instructed to follow. The rendered top-down map may also include an indicator 64 of the current aircraft location (illustrated in FIG. 5 as a triangle). Such a top-down map typically provides a wider prospective of the planned route. Although not illustrated on FIG. 5, the processing element may also determine at which points along the route the pilot should stop the aircraft, e.g., prior to crossing an active runway, and may display a "stop sign" or some other indicator of the need to stop at such points.

The processing element may be further configured to render a top-down representation of a portion of a taxiway/runway upon which the aircraft is currently located, and its immediate next movement, for display on the HWD. Such a tactical display may be referred to as a "bread-crumb" display. Referring now to FIG. 6, a display of such a top-down representation 70 is illustrated, in accordance with an embodiment of the invention. The portion of the taxiway/runway comprises a predetermined length of taxiway/runway forward of the aircraft and, optionally, may comprise a predetermined length of taxiway/runway aft of the aircraft (although FIG. 6 does not illustrate such a portion aft of the aircraft). The top-down display typically uses standardized airport surface markings and colors, thus utilizing symbology for which the pilot is already familiar. The top-down representation comprises side boundaries or edges 76 of the rendered portion of the taxiway/runway. The top-down representation comprises an aircraft indicator 72 showing a position of the aircraft relative to the taxiway/runway and to the edges. The aircraft indicator comprises wheel assembly indicators 74 showing positions of the wheel assemblies relative to the edges. The top-down representation comprises an identifier 80 of the taxiway/runway upon which the aircraft is currently located and/or approaching. The representation of FIG. 6 comprises forward markings 78 showing a planned route of the aircraft on the rendered portion of the taxiway/runway, and, optionally, may comprise aft markings showing a past route of the aircraft on the rendered portion of the taxiway/runway. The route markings may be a continuous line, or may be a series of spaced apart markers as shown in FIG. 6. As discussed above, the top-down representation of FIG. 6 may be separately displayed or may be superimposed on the virtual airport scene as illustrated in FIG. 3.

The different display modes of the system of the present invention (e.g., virtual) airport scene, taxi clearance, top-down airport map, top down taxiway/runway portion) may each be separately displayed on the HWD. The processing element may receive voice commands from the pilot to select which mode is displayed. Alternatively, two or more display modes may be simultaneously displayed on the HWD. For example, the virtual airport scene and the top-down airport map may be displayed together (e.g., in a side-by-side orientation). The pilot may select different modes to display at different times during taxiing.

Testing has been performed to demonstrate the efficacy of the system of the present invention, including a head-worn display which provides unlimited field-of-regard, for surface operations. The results demonstrate that providing pilots with the ability to virtually see well beyond visual range can significantly increase situation awareness and task performance on the airport surface. Pilots were better able to perform the taxiing evaluation task and reported significantly higher situational awareness as compared to an electronic moving map or paper charts of the airport environment.

With regard to display mode integration, pilots reported that the four modes (virtual airport scene, taxi clearance, top-down airport map, top down taxiway/runway portion) each have relative merits in supporting taxi operations. For complex operational environments, the textual taxi clearance mode was reported to be of significant value in ensuring compliance with ground instructions. However, this mode would likely not by itself be enough to significantly improve aviation safety. It is only when combined with one or more of the other modes that its full potential becomes evident. In fact, essentially this same observation was witnessed for each of the modes. For example, pilots reported that the top-down airport map was of substantial benefit but it did not provide them with the precision provided by the top down taxiway/runway portion. However, the top down taxiway/runway portion only provided local guidance and the pilots felt that they lacked global situation awareness. The virtual airport scene helped give pilots a sense of immersion; that is, the feeling that they were looking outside the cockpit into the real-world. This resulted in high situation awareness but again, pilots felt that the precision and the "big picture" were missing. Therefore, each of the modes contributed something unique and helpful. FIG. 3 represents the integration of three of these modes (virtual airport scene, taxi clearance, top down taxiway/runway portion) into a single display.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed as new and desired to be secured by Letters Patent of the United States is:

1. A system for multi-modal cockpit interface during surface operation of an aircraft, the system comprising:
    a head tracking device;
    a processing element configured to, during surface operation of the aircraft, receive head position information from the head tracking device, to receive current location information of the aircraft, and to render a virtual airport scene corresponding to the head position information and the current aircraft location; and
    a full-color head worn display configured to receive the virtual airport scene from the processing element and to display the virtual airport scene.

2. The system of claim 1, wherein the processing element receives the current location information from a global positioning system, an inertial navigation system, or a multilateration position system.

3. The system of claim 1, wherein the processing element is further configured to receive current location information of other vehicles near the aircraft and to render the other vehicles within the virtual airport scene.

4. The system of claim 1, wherein the processing element is further configured to receive taxi clearance information and wherein the head worn display is further configured to receive the taxi clearance information from the processing element and to display the taxi clearance information.

5. The system of claim 4, wherein the processing element receives the taxi information via one of a voice link or a data link, and wherein, if the taxi information is received via a voice link, the processing element is further configured to convert the taxi information into text.

6. The system of claim 4, wherein the taxi clearance information comprises a plurality of sequential instructions, and wherein the processing element is configured to determine, based on the current aircraft location, which of the sequential instructions has been performed and which is next to be performed such that the next sequential instruction to be performed may be indicated on the display of the taxi clearance information.

7. The system of claim 4, wherein the processing element is further configured to render a top-down airport map illustrating a taxi route based on the taxi clearance information, and wherein the head worn display is further configured to receive the top-down airport map from the processing element and to display the top-down airport map.

8. The system of claim 7, wherein the processing element is further configured to render an indicator of the current aircraft location on the top-down airport map.

9. A system for multi-modal cockpit interface during surface operation of an aircraft, the system comprising:

a head tracking device;
a processing element configured to receive head position information from the head tracking device, to receive current location information of the aircraft, and to render a virtual airport scene corresponding to the head position information and the current aircraft location; and
a full-color head worn display configured to receive the virtual airport scene from the processing element and to display the virtual airport scene,
and wherein the processing element is further configured to receive taxi clearance information and wherein the head worn display is further configured to receive the taxi clearance information from the processing element and to display the taxi clearance information,
wherein the processing element is further configured to render a top-down airport map illustrating a taxi route based on the taxi clearance information, and wherein the head worn display is further configured to receive the top-down airport map from the processing element and to display the top-down airport map,
wherein the processing element is further configured to render a top-down representation of a portion of a taxiway/runway upon which the aircraft is currently located, the portion of the taxiway/runway comprising a predetermined length of taxiway/runway forward of the aircraft, the representation comprising edges of the rendered portion of the taxiway/runway, the representation further comprising an aircraft indicator showing a position of the aircraft relative to the edges, the aircraft indicator comprising wheel assembly indicators showing positions of the wheel assemblies relative to the edges,
and wherein the head worn display is further configured to receive the representation from the processing element and to display the representation.

10. The system of claim 9, wherein the representation further comprises an identifier of the taxiway/runway upon which the aircraft is currently located.

11. The system of claim 9, wherein the representation further comprises forward markings showing a planned route of the aircraft on the rendered portion of the taxiway/runway.

12. The system of claim 1, wherein the processing element is further configured to receive a pilot display preference, and wherein the head worn display is further configured to receive and display one or more of the virtual airport scene, the taxi clearance information, the top-down airport map, and the representation of the taxiway/runway upon which the aircraft is currently located, based on the received pilot display preference.

13. A device for multi-modal cockpit interface during surface operation of an aircraft, the device comprising:
a processing element configured to, during surface operation of the aircraft:
receive head position information from a head tracking device;
receive current location information of the aircraft;
render a virtual airport scene corresponding to the head position information and the current aircraft location; and
provide the virtual airport scene to a full-color head worn display capable of displaying the virtual airport scene.

14. The device of claim 13, wherein the processing element receives the current location information from a global positioning system, an inertial navigation system, or a multilateration position system.

15. The device of claim 13, wherein the processing element is further configured to receive current location information of other vehicles near the aircraft and to render the other vehicles within the virtual airport scene.

16. The device of claim 13, wherein the processing element is further configured to receive taxi clearance information and to provide the taxi information to the head worn display.

17. The device of claim 16, wherein the processing element receives the taxi information via one of a voice link or a data link, and wherein, if the taxi information is received via a voice link, the processing element is further configured to convert the taxi information into text.

18. The device of claim 16, wherein the taxi clearance information comprises a plurality of sequential instructions, and wherein the processing element is configured to determine, based on the current aircraft location, which of the sequential instructions has been performed and which is next to be performed such that the next sequential instruction to be performed may be indicated on the display of the taxi clearance information.

19. The device of claim 16, wherein the processing element is further configured to render a top-down airport map illustrating a taxi route based on the taxi clearance information, and to provide the top-down airport map to the head worn display.

20. The device of claim 19, wherein the processing element is further configured to render an indicator of the current aircraft location on the top-down airport map.

21. A device for multi-modal cockpit interface during surface operation of an aircraft, the device comprising:
a processing element configured to:
receive head position information from a head tracking device;
receive current location information of the aircraft;
render a virtual airport scene corresponding to the head position information and the current aircraft location; and
provide the virtual airport scene to a full-color head worn display capable of displaying the virtual airport scene,
and wherein the processing element is further configured to receive taxi clearance information and to provide the taxi information to the head worn display,
wherein the processing element is further configured to render a top-down airport map illustrating a taxi route based on the taxi clearance information, and to provide the top-down airport map to the head worn display,
wherein the processing element is further configured to render a top-down representation of a portion of a taxiway/runway upon which the aircraft is currently located, the portion of the taxiway/runway comprising a predetermined length of taxiway/runway forward of the aircraft, the representation comprising edges of the rendered portion of the taxiway/runway, the representation further comprising an aircraft indicator showing a position of the aircraft relative to the edges, the aircraft indicator comprising wheel assembly indicators showing positions of the wheel assemblies relative to the edges,
and wherein the processing element is configured to provide the representation to the head worn display.

22. The device of claim 21, wherein the representation further comprises an identifier of the taxiway/runway upon which the aircraft is currently located.

23. The device of claim 21, wherein the representation further comprises forward markings showing a planned route of the aircraft on the rendered portion of the taxiway/runway.

24. The device of claim 13, wherein the processing element is further configured to receive a pilot display preference, and wherein the processing element is further configured to provide to the head worn display one or more of the virtual airport scene, the taxi clearance information, the top-down airport map, and the representation of the taxiway/runway upon which the aircraft is currently located, based on the received pilot display preference.

25. A method for multi-modal cockpit interface during surface operation of an aircraft, the method comprising the steps of:
receiving, in a processing element during surface operation of the aircraft, head position information from a head tracking device;
receiving, in the processing element during surface operation of the aircraft, current location information of the aircraft;
rendering, in the processing element during surface operation of the aircraft, a virtual airport scene corresponding to the head position information and the current aircraft location;
receiving, in a full-color head worn display during surface operation of the aircraft, the virtual airport scene from the processing element; and
displaying, during surface operation of the aircraft, the virtual airport scene on the head worn display.

26. The method of claim 25, wherein the processing element receives the current location information from one of a global positioning system, an inertial navigation system, or a multi-lateration position system.

27. The method of claim 25, further comprising the steps of:
receiving, in the processing element, current location information of other vehicles near the aircraft; and
rendering, in the processing element, the other vehicles within the virtual airport scene.

28. The method of claim 25, further comprising the steps of:
receiving, in the processing element, taxi clearance information;
receiving, in the head worn display, the taxi clearance information from the processing element; and
displaying the taxi clearance information on the head worn display.

29. The method of claim 28, wherein the processing element receives the taxi information via one of a voice link or a data link, and wherein, if the processing element receives the taxi information via a voice link, the method further comprises the step of converting the taxi information into text in the processing element.

30. The method of claim 28, wherein the taxi clearance information comprises a plurality of sequential instructions, and wherein the method further comprises the step of determining, in the processing element and based on the current aircraft location, which of the sequential instructions has been performed and which is next to be performed such that the next sequential instruction to be performed may be indicated on the display of the taxi clearance information.

31. The method of claim 28, further comprising the steps of:
rendering, in the processing element, a top-down airport map illustrating a taxi route based on the taxi clearance information;
receiving, in the head worn display, the top-down airport map from the processing element; and
displaying the top-down airport map on the head worn display.

32. The method of claim 31, further comprising the step of rendering, in the processing element, an indicator of the current aircraft location on the top-down airport map.

33. A method for multi-modal cockpit interface during surface operation of an aircraft, the method comprising the steps of:
receiving, in a processing element, head position information from a head tracking device;
receiving, in the processing element, current location information of the aircraft;
rendering, in the processing element, a virtual airport scene corresponding to the head position information and the current aircraft location;
receiving, in a full-color head worn display, the virtual airport scene from the processing element;
displaying the virtual airport scene on the head worn display;
receiving, in the processing element, taxi clearance information;
receiving, in the head worn display, the taxi clearance information from the processing element;
displaying taxi clearance information on the head worn display;
rendering, in the processing element, a top-down airport map illustrating a taxi route based on the taxi clearance information;
receiving, in the head worn display, the top-down airport map from the processing element;
displaying the top-down airport map on the head worn display;
rendering, in the processing element, a top-down representation of a portion of a taxiway/runway upon which the aircraft is currently located, the portion of the taxiway/runway comprising a predetermined length of taxiway/runway forward of the aircraft, the representation comprising edges of the rendered portion of the taxiway/runway, the representation further comprising an aircraft indicator showing a position of the aircraft relative to the edges, the aircraft indicator comprising wheel assembly indicators showing positions of the wheel assemblies relative to the edges;
receiving, in the head worn display, the representation from the processing element; and
displaying the representation on the head worn display.

34. The method of claim 33, wherein the representation further comprises an identifier of the taxiway/runway upon which the aircraft is currently located.

35. The method of claim 33, wherein the representation further comprises forward markings showing a planned route of the aircraft on the rendered portion of the taxiway/runway.

36. The method of claim 25, further comprising the steps of:
receiving, in the processing element, a pilot display preference; and
receiving and displaying, in the head worn display, one or more of the virtual airport scene, the taxi clearance information, the top-down airport map, and the representation of the taxiway/runway upon which the aircraft is currently located, based on the received pilot display preference.

* * * * *